United States Patent
Bister et al.

(10) Patent No.: US 6,623,649 B2
(45) Date of Patent: Sep. 23, 2003

(54) PROCESS FOR REMOVING CYCLIC ACETALS FROM WASTEWATER STREAMS

(75) Inventors: Hans-Jurgen Bister, Neuss (DE); Alexander Gammersbach, Neuss (DE); Axel Gohrt, Cologne (DE); Joachim Grub, Dormagen (DE); Stefanie Konig, Dormagen (DE)

(73) Assignee: BP Koln GmbH, Cologne (DE)

( * ) Notice: Subject to any disclaimer, the term of this patent is extended or adjusted under 35 U.S.C. 154(b) by 0 days.

(21) Appl. No.: 09/873,448

(22) Filed: Jun. 5, 2001

(65) Prior Publication Data

US 2002/0040877 A1 Apr. 11, 2002

(30) Foreign Application Priority Data

Jun. 6, 2000 (DE) .......................................... 100 27 892

(51) Int. Cl.$^7$ .................................................... C02F 1/00
(52) U.S. Cl. ......................... 210/763; 568/852; 568/854
(58) Field of Search ................................. 210/660, 763; 568/852, 854

(56) References Cited

U.S. PATENT DOCUMENTS 6,232,512 B1 * 5/2001 Haas et al.
6,265,623 B1 * 7/2001 Morawietz et al.

* cited by examiner

*Primary Examiner*—Betsey Morrison Hoey
(74) *Attorney, Agent, or Firm*—Finnegan, Henderson, Farabow, Garrett and Dunner, L.L.P.

(57) ABSTRACT

A process is provided which makes it possible to separate off cyclic acetals from wastewater streams to a substantial extent, by passing the wastewater stream over a heterogeneous acid catalyst.

15 Claims, No Drawings

PROCESS FOR REMOVING CYCLIC ACETALS FROM WASTEWATER STREAMS

BACKGROUND OF THE INVENTION

The present invention relates to a process for removing cyclic acetals from wastewater streams over heterogeneous acid catalysts.

Cyclic acetals such as 1,3-dioxane, 1,3-dioxolane and their derivatives are prepared by reacting diols and aldehydes. 1,3-Dioxolane is synthesized, for example, from ethylene glycol and formaldehyde, the reaction being carried out in the presence of acid catalysts. Acid catalysts used here are the most varied Brøonstedt or Lewis acids, but also cation exchangers, such as sulphonated polystyrene resins (Chopade, React. Funct. Polym. 1997, 34, 37–45). After the main quantity of the desired product has been isolated, the wastewaters from such acetal preparation processes, however, still always contain certain amounts of acetals whose separation from the wastewater poses difficulties. In the preparation of α,ω-diols, such as 1,2-diols, 1,3-diols or 1.4-diols, certain amounts of cyclic acetals can also be formed, due to side reactions of these diols with aldehydes formed by oxidation, and can pass into the wastewater.

Compared with open-chain acetals, the cyclic acetals are most stable. They are stable, especially, to bases and oxidizing or reducing media. Under the conditions in a biological sewage treatment plant (neutral pH and oxidizing media), cyclic acetals are thus not attacked or degraded.

It is already known that organic compounds such as phenol and chlorobenzene can be removed from wastewaters by adsorption on absorber resins and activated carbon (Ullmann, 1995, B8, pp. 126–128). However, such processes have the disadvantage that the adsorber materials used are active for a limited time and must therefore be renewed. When such resins are regenerated with methanol or other solvents, in addition, a further liquid stream to be disposed of is produced.

An object of the present invention is to provide a process by which the content of cyclic acetals in wastewater streams can be reduced.

SUMMARY OF THE INVENTION

The invention relates to a process for removing cyclic acetals from wastewater streams which is characterized in that the cyclic acetal-containing wastewater streams are passed over a heterogeneous acid catalyst.

DETAILED DESCRIPTION OF THE INVENTION

The wastewater streams used in the inventive process preferably comprise 5-, 6- or 7-membered cyclic acetals or their substituted derivatives. These wastewater streams are customarily produced in the synthesis of the cyclic acetals. However, they can also arise, as described above, in the synthesis of the respective α,ω-diols underlying the cyclic acetals, i.e. the 5-membered acetals based on 1,3-dioxolane in ethylene glycol preparation, the 6-membered acetals based on 1,3-dioxane in propylene glycol preparation and the 7-membered acetals in 1,4-butanediol preparation.

Particular preference is given to 1,3-dioxolanes of the general formula (I)

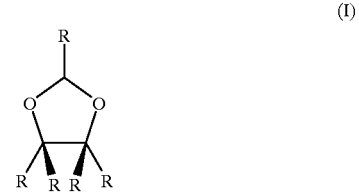

where
R is identical or different and represents hydrogen, halogen or an unbranched or branched, saturated or unsaturated $C_1$–$C_7$ hydrocarbon radical which can optionally be substituted by one or more halogen radicals,
or 1,3-dioxanes of the general formula (II).

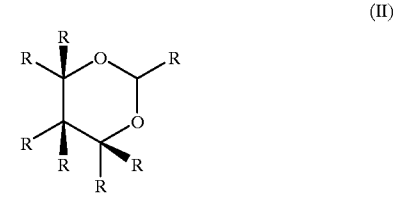

where
R has the meanings specified for the general formula (I).

The 1,3-dioxolanes of the general formula (I) and the 1,3-dioxanes of the general formula (II) are preferably substituted by one or two radicals R.

The inventive process has particularly utility for wastewater streams which comprise 1,3-dioxolane, 1,3-dioxane, their respective halogen-substituted derivatives or their respective 2-mono-($C_1$–$C_5$)-alkyl, 2,4-di-($C_1$–$C_5$)-alkyl derivatives.

In particular, the radical R in the general formulae (I) and (II) takes the meanings fluorine, chlorine, bromine, iodine, methyl, ethyl or chloromethyl.

The concentration of the cyclic acetals in the wastewater stream can be in the range 0.1–100 000 ppm, preferably 20–10 000 ppm, in particular 1–5 000 ppm.

In the wastewater stream, one or more different cyclic acetals of the general formulae (I) and (II) can be present. In addition to the cyclic acetals, the wastewater streams can, if appropriate, also comprise other organic substances or solvents, such as aliphatic hydrocarbons or ethers, which are inert to the heterogeneous acid catalyst under the respective reaction conditions in the inventive process.

The inventive process is customarily carried out in such a manner that the wastewater stream loaded with the cyclic acetal or cyclic acetals is passed over the heterogeneous acid catalyst at a temperature in the range 10–120° C., preferably 20–80° C., a pressure in the range 0.5–20 bar, preferably 0.5–10 bar, in particular 0.8–2 bar, and an LHSV less than 200 $h^{-1}$, preferably in the range 0.1–25 $h^{-1}$, particularly preferably 0.1–10 $h^{-1}$.

The heterogeneous acid catalysts used in the inventive process are known in principle. Preferably, the heterogeneous acid catalyst is a cation exchanger in the $H^+$ form. Such acid cation exchangers are macroporous or in the form of a gel and are commercially available. They can be prepared, for example, by copolymerization of vinyl monomers and divinyl crosslinkers, if appropriate in the presence of solvents, or by condensation of phenol and formaldehyde.

Vinyl monomers which can be used are, for example, styrene or acrylic esters; divinyl crosslinker is, for example, divinylbenzene. Acid groups are, for example, carboxyl group, phosphonic acid groups or sulphonic acid groups.

Preferably, macroporous acid cation exchangers are used. The mean pore radius of such macroporous cation exchangers can be, for example, in the range 50–1200 Å, preferably 70–500 Å. The acid cation exchangers can be used, for example, as polymer beads having particle sizes of 0.1–2 mm or as powder resin having particle sizes of 10–100 μm.

The use of a macroporous or gel-form acid $SO_3H$-group-containing cation exchanger having a degree of crosslinking of 2–65% and a surface area per unit volume of 5–750 m$^2$/g of dry cation exchanger is particularly advantageous.

In the inventive process, a chemical degradation of the cyclic acetals takes place over the heterogeneous acid catalyst, in that they are cleaved into their starting components, i.e. diols and aldehydes. These can then be successfully degraded in the realm of biological wastewater treatment. As a result, further chemical work-up of the wastewater after the inventive process is unnecessary.

In addition, the heterogeneous acid catalysts used do not lose activity in the course of the inventive process, as do the adsorber materials known from the prior art for separating off phenols and chlorobenzenes, but have a considerably longer service life, since the cleavage products of the cyclic acetals are discharged again with the wastewater and do not remain on the heterogeneous catalyst. This makes a critical contribution to the economic attractiveness of the inventive process.

EXAMPLES 1 TO 4

Deionized water which comprises in each case the 1,3-dioxolane specified in Table 1 in the concentration specified there between 300 and 450 ppm is passed over 10 ml of an acid sulphonated polystyrene resin at various temperatures and space velocities at atmospheric pressure. The acid sulphonated polystyrene resin used is either Lewatit® K2621 (Bayer AG, Germany) or Amberlyst® 38WET (Rohm and Haas, USA).

Table 1 summarizes the initial and final concentrations of the respective dioxolanes in the deionized water under the various conditions.

TABLE 1

| Example | 1 | 2 | 3 | 4 |
|---|---|---|---|---|
| Deionized water containing | 1,3-dioxolane | 1,3-dioxolane | 2-methyl-1,3-dioxolane | 2-chloromethyl-1,3-dioxolane |
| Ion exchanger | Lewatit K2621 | Amberlyst 38 WET | Lewatit K2621 | Lewatit K2621 |
| Temperature [° C.] | 70 | 70 | 20 | 70 |
| LHSV [h$^{-1}$] | 10 | 10 | 10 | 10 |
| Initial dioxolane concentration [ppm] | 350 | 345 | 450 | 300 |
| Final dioxolane concentration [ppm] | 15 | 5 | 5 | 100 |

We claim:

1. A process for removing cyclic acetals from wastewater streams, comprising passing a cyclic-acetal-containing wastewater stream over a heterogeneous acid catalyst at a temperature in the range 10–120° C.

2. Process according to claim 1, wherein the wastewater stream contains 5-, 6- or 7-membered cyclic acetals or their substituted derivatives.

3. Process according to claim 1, wherein the wastewater stream contains 1,3-dioxolanes of the general formula (I)

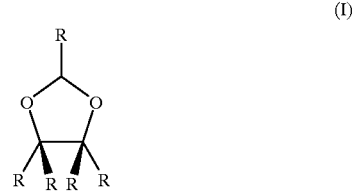

(I)

where
R is identical or different and represents hydrogen, halogen or an unbranched or branched, saturated or unsaturated $C_1$–$C_7$ hydrocarbon radical which can optionally be substituted by one or more halogen radicals,
or 1,3-dioxanes of the general formula (II),

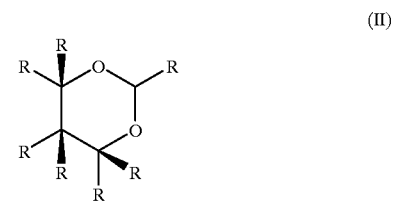

(II)

where
R has the meanings specified for the general formula (I).

4. Process according to claim 3, wherein the 1,3-dioxolanes of the general formula (I) or the 1,3-dioxanes of the general formula (II) are substituted by one or two radicals R.

5. Process according to claim 3, wherein the radical R in the general formulae (I) and (II) represents fluorine, chlorine, bromine, iodine, methyl, ethyl or chloromethyl.

6. Process according to claim 1, wherein the wastewater stream contains 1,3-dioxolane, 1,3-dioxane, their respective halogen-substituted derivatives or their respective 2-mono-($C_1$–$C_5$)-alkyl or 2,4-di-($C_1$–$C_5$)-alkyl derivatives.

7. Process according to claim 1, wherein the concentration of the cyclic acetals in the wastewater stream is 0.1–100 000 ppm.

8. Process according to claim 1, wherein the wastewater stream is passed over the heterogeneous acid catalyst at a pressure in the range 0.5–20 bar and an LHSV less than 200 h$^{-1}$.

9. Process according to claim 1, wherein the wastewater stream is passed over the heterogeneous acid catalyst at a temperature in the range 20–80° C., a pressure in the range 0.5–10 bar, and an LHSV in the range 0.1–25 h$^{-1}$.

10. Process according to claim 1, wherein the wastewater stream is passed over the heterogeneous acid catalyst at a temperature in the range 20–80° C., a pressure in the range 0.8–2 bar, and an LHSV in the range 0.1–10 n$^{-1}$.

11. Process according to claim 1, wherein the heterogeneous acid catalyst is an acid cation exchanger in the H$^+$ form.

12. Process according to claim 11, wherein the acid cation exchanger is a macroporous acid cation exchanger whose mean pore radius is in the range 50–1 200 Å.

13. Process according to claim 11, wherein the acid cation exchanger is used as polymer beads having particle sizes 0.1–2 mm or as powder resin having particle sizes of 10–100 μm.

14. Process according to claim 11, wherein the acid cation exchanger is a macroporous or gel-form acid $SO_3H$-group-containing cation exchanger having a degree of crosslinking of 2–65% and a surface area per unit volume of 5–750 $m^2/g$ of dry cation exchanger.

15. Process according to claim 1, wherein the wastewater stream, after it has been passed over the heterogeneous acid catalyst, is subjected to a biological wastewater treatment.

* * * * *

UNITED STATES PATENT AND TRADEMARK OFFICE
CERTIFICATE OF CORRECTION

PATENT NO. : 6,623,649 B2
DATED : September 23, 2003
INVENTOR(S) : Hans-Jurgen Bister et al.

It is certified that error appears in the above-identified patent and that said Letters Patent is hereby corrected as shown below:

<u>Column 4,</u>
Line 57, "0.1-10 $n^{-1}$." should read -- 0.1 -- 10 $h^{-1}$. --.

Signed and Sealed this

Eleventh Day of May, 2004

JON W. DUDAS
*Acting Director of the United States Patent and Trademark Office*